UNITED STATES PATENT OFFICE.

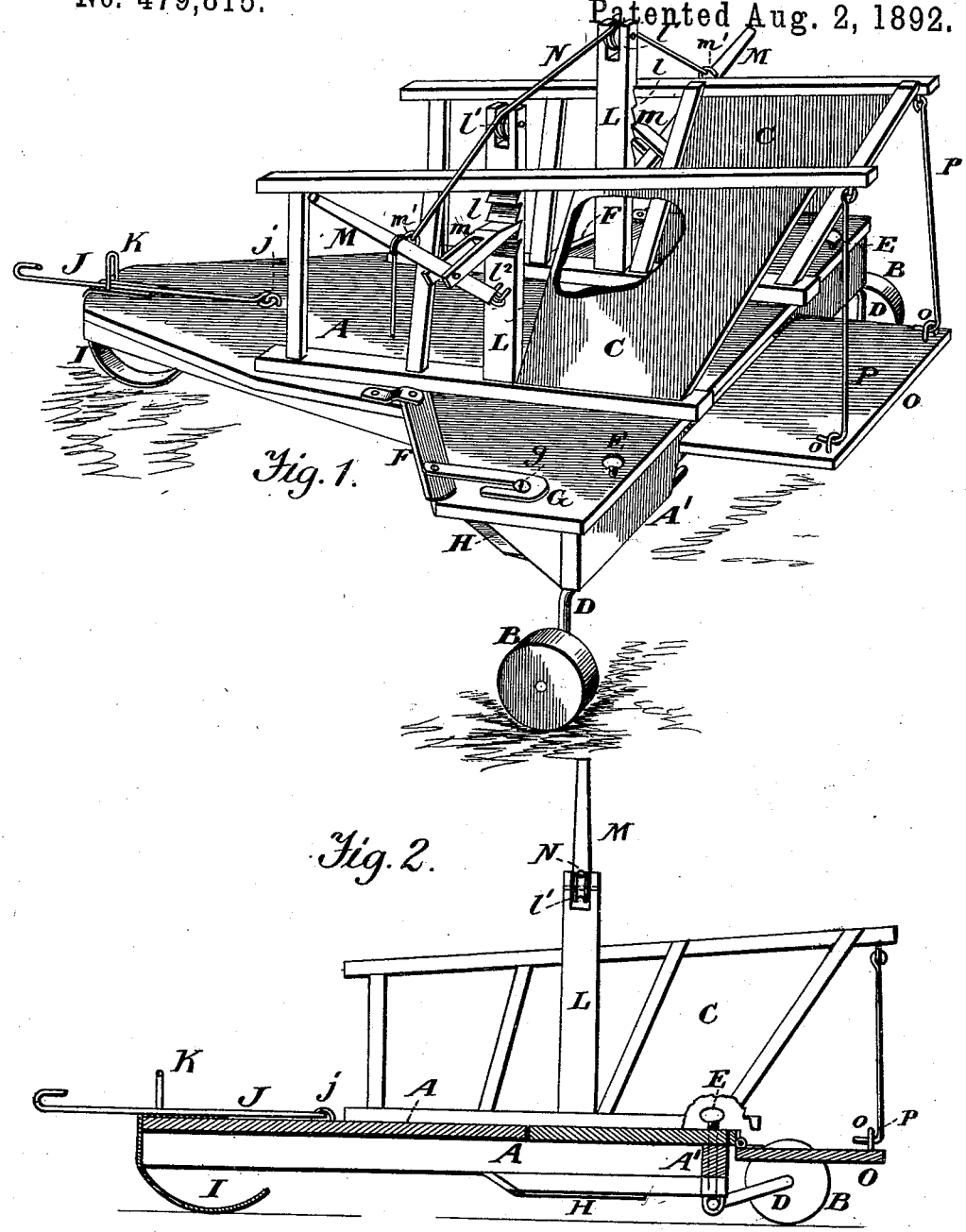

JOHN KIPP, SR., OF PIQUA, KANSAS.

CORN CUTTER OR HARVESTER.

SPECIFICATION forming part of Letters Patent No. 479,815, dated August 2, 1892.

Application filed February 3, 1892. Serial No. 420,188. (No model.)

*To all whom it may concern:*

Be it known that I, JOHN KIPP, Sr., a citizen of the United States, residing at Piqua, in the county of Woodson and State of Kansas, have invented certain new and useful Improvements in Corn Cutters or Harvesters; and I do hereby declare the following to be a full, clear, and exact description of the invention, such as will enable others skilled in the art to which it appertains to make and use the same.

The special object of the invention is to make a convenient corn-harvester which will cut two rows at once and which may be drawn by one horse, which will walk between the rows.

Figure 1 of the drawings is a perspective view, and Fig. 2 a longitudinal vertical section, of my device.

In the drawings, A represents the platform, B B the wheels, and C C the sides or uprights, which are fastened at bottom to the platform, the wheels being arranged on separate crank-shafts D D, which are adjustable in their bearings on the platform-frame A' and held at any adjustment by a clamp-screw E.

By adjusting each axle differently the cutter will run level on the sides of hills, and by adjusting them equally the platform may be raised or lowered, so as to cut the corn high or low.

F F are the opposite cutters, which are arranged obliquely to the line of progression of the machine, so as to give them a "draw-cut," pivoted at their inner end and connected at outer end with the platform A by the hook or the screw-pivot $g$, by which said plate may be clamped at different adjustments to regulate the position of the knife. Below the blades F, on top of the platform, I arrange fixed blades H to cut the corn-stumps close to the ground.

I is a curved spring under the front end of the platform to take up the jolt and jar to the machine when the front passes over obstructions instead of the ordinary rigid wooden sled-runner usually employed.

J is a draft-bar hook whose rear end is pivoted at $j$ to allow it to play up and down in a vertical plane in the loop-guide K.

L L are opposite standards secured to the sides C C, each standard having the outside ratchet $l$, the top pulley $l'$, and exterior eyes $l^2$. To these eyes are jointed the ends of the levers M M, which have inside slotted and rear-pivoted pawls $m$ $m$ to work in the ratchets $l$. On the inside of each lever is an eye $m'$, to which is attached the tie-cord N, which is first made fast to one eye and then carried over the pulleys $l'$ $l'$ before the other end is passed through the second eye. By this means the fodder which has been piled between the sides may be securely tied down.

O is a hinged tail-chute held at the outer end by the hooks P, which engage the eyes $o$ $o$ on the outer edge of the chute.

The operation is as follows: A single horse walks between two corn-rows which are cut at the same time, each knife F cutting one row so as to leave the stubble not suitable for fodder, while the subjacent and rearward knives H cut this stubble off close to the ground, so that the ground may be better plowed.

In order to use my corn-harvester, I attach the cord N to the levers, allow it to rest on the bottom of the wagon, and have the corn placed in the wagon with the butt-ends resting on the tail-board. When enough corn has been put in to make up a shock, the levers are operated so as to raise the heap of corn a little. A man now passes the twine around the corn, so as to form a permanent shock, when the levers are raised to their full height, the tail-board dropped, and the shock thereby set up on the ground.

Having thus described all that is necessary to a full understanding of my invention, what I claim as new, and desire to protect by Letters Patent, is—

A corn-cutter provided with upright sides on its platform, ratcheted standards L L, with pulleys at the top, the levers M M, carrying the pawls $m$ $m$, and the tie-cord N', whereby the fodder may be securely held and transported, as set forth.

In testimony whereof I affix my signature in presence of two witnesses.

JOHN KIPP, SR.

Witnesses:
 L. W. WRIGHT,
 SHELBY PURCELL.